No. 896,709. PATENTED AUG. 25, 1908.
A. V. BRYCE.
BOLT FASTENING DEVICE.
APPLICATION FILED SEPT. 16, 1907.
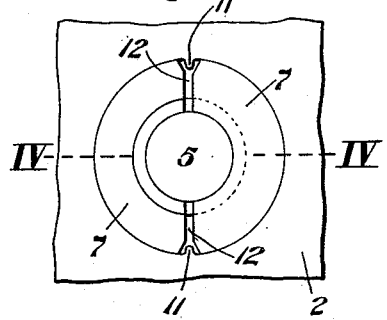
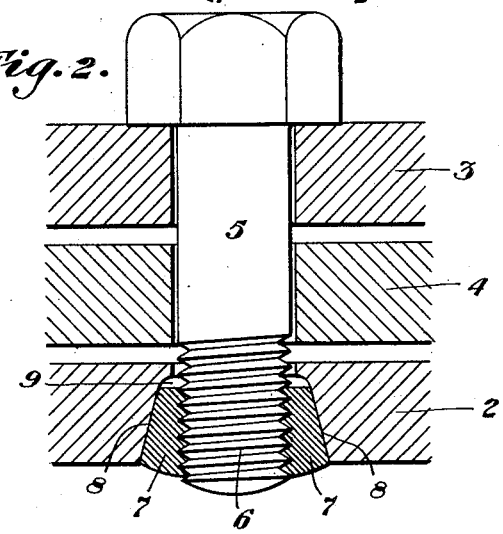

ately holding the parts together and prevent-
UNITED STATES PATENT OFFICE.

ANDREW V. BRYCE, OF PITTSBURG, PENNSYLVANIA, ASSIGNOR TO INTER STATE MANUFACTURING COMPANY, OF PITTSBURG, PENNSYLVANIA, A CORPORATION OF ARIZONA TERRITORY.

BOLT-FASTENING DEVICE.

No. 896,709.      Specification of Letters Patent.      Patented Aug. 25, 1908.

Application filed September 16, 1907. Serial No. 393,074.

*To all whom it may concern:*

Be it known that I, ANDREW V. BRYCE, a citizen of the United States, residing at Pittsburg, in the county of Allegheny and State of Pennsylvania, have invented certain new and useful Improvements in Bolt-Fastening Devices, of which the following is a specification, reference being had therein to the accompanying drawing.

My invention consists of an improvement in locking or securing devices for threaded bolts, adapted to coöperate with one element of any structure which it is designed to fasten together, in such a manner as to avoid the necessity of the usual nut.

It is designed to simplify and cheapen the construction, avoid the usual nut or any projecting device at the threaded end of the bolt, and to provide means for securely and positively holding the parts together and preventing loosening or movement after being set.

Referring to the drawings: Figure 1 is a face view showing the threaded end of the bolt incorporated with the element to be secured, by means of my improvement. Fig. 2 is a horizontal cross sectional view on the line IV. IV. of Fig. 1.

The invention is designed to utilize any one of several elements, as for instance fish plate 2 of an ordinary rail joint as shown in Fig. 2 so as to securely hold said fish plate with the opposite fish plate 3 in binding engagement with the rail 4 by means of bolt 5 having the usual terminal threads 6. The fish plate 2, or any other element to be secured, is recessed to receive the tapered bushings 7, being provided with inwardly tapering walls 8 preferably terminating in inwardly curved bases 9, and adapted to receive the tapered bushings 7 having the correspondingly tapered faces 10, as clearly shown in Fig. 2.

In the construction shown in Figs. 1 and 2, the recesses for the bushings are in the form of a truncated cone, in cross section and preferably provided with inwardly extending lugs or abutments 11 at one or both sides adapted to project inwardly between the bushings, which are so constructed as to leave a corresponding intervening recess 12 for such purpose. A further advantage of the clearance 12 is that in the operation of tightening the device and drawing the bushings inwardly they may approach toward each other sufficiently to grip the threads in the manner for which the construction is designed. To facilitate insertion and provide the bearing ends with good clearance, the outer edges of the bushings are beveled off as shown in Fig. 1. As thus arranged, the bolt 5 may be screwed into the bushings, resulting in drawing them inwardly against the tapered faces 8 of the receiving socket, thereby forcing them inwardly around the threads 6, which effect is assisted by means of the inwardly curved base portion 9, so that when the bolt is screwed up tight, its head will bear tightly against the outer face of fish plate 3 and fish plate 2 will be correspondingly securely held, while the gripping action of the bushings 7 upon the threads will absolutely lock the parts together against rotation.

In addition to the great holding power of my improved device, it will be seen that substantially the whole body portion of the bushings is contained within the fish plate 2, and as stated such construction may be employed with any other form of mechanism with which the device is to be incorporated.

It will be understood that the invention may be changed or varied in different details or features by the skilled mechanic and applied to various uses, but all such changes or variations are to be considered as within the scope of the following claims.

What I claim is:

1. The combination with a fixed base provided with a tapered socket and having one or more inwardly extending lugs or abutments projecting in to the socket cavity, of a plurality of bushing sections having interior threads and correspondingly tapered outer faces assembled within said socket with their ends engaging at each side of said lugs or abutments, substantially as set forth.

2. The combination with a fixed base provided with a tapered socket and having one or more inwardly extending lugs or abutments projecting into the socket cavity, of a plurality of bushing sections having interior threads and correspondingly tapered outer faces assembled within said socket and having their ends beveled across and adapted to bear against said lugs or abutments, substantially as set forth.

In testimony whereof I affix my signature in presence of two witnesses.

ANDREW V. BRYCE.

Witnesses:
　GEO. B. BLEMING,
　C. M. CLARKE.